United States Patent
Raad et al.

[11] Patent Number: 5,948,028
[45] Date of Patent: Sep. 7, 1999

[54] METHOD OF IMPROVING RESPONSE TIME IN A VEHICLE ACTIVE TILT CONTROL SYSTEM

[75] Inventors: Joseph Michael Raad, Southgate; John Allen Oliver, Jr., Canton; Russell Lee Norton, Dearborn Heights; Vladimir V. Kokotovic, Bloomfield Hills, all of Mich.

[73] Assignee: Ford Global Technologies, Inc., Dearborn, Mich.

[21] Appl. No.: 09/018,160

[22] Filed: Feb. 3, 1998

[51] Int. Cl.⁶ ..................................................... G06F 17/00
[52] U.S. Cl. ................................. 701/37; 701/38; 701/66; 280/5.5; 280/5.512; 180/197
[58] Field of Search .................................. 701/37, 38, 66, 701/41, 79, 91; 180/197, 199; 280/5.5, 5.503, 5.512, 5.507, 5.513, 5.502, 5.514

[56] References Cited

U.S. PATENT DOCUMENTS

| | | | |
|---|---|---|---|
| 4,589,676 | 5/1986 | Meloche et al. | 280/707 |
| 4,797,823 | 1/1989 | Ikemoto et al. | 364/424.05 |
| 5,087,068 | 2/1992 | Fukanaga et al. | 280/707 |
| 5,103,397 | 4/1992 | Ikemoto et al. | 364/424.05 |
| 5,173,858 | 12/1992 | Wada et al. | 364/424.05 |
| 5,294,146 | 3/1994 | Tabata et al. | 280/707 |
| 5,295,705 | 3/1994 | Butsuen et al. | 280/707 |
| 5,361,209 | 11/1994 | Tsutsumi | 364/424.05 |
| 5,570,289 | 10/1996 | Stacey et al. | 364/424.05 |
| 5,606,503 | 2/1997 | Shal et al. | 364/423.098 |
| 5,619,413 | 4/1997 | Oakley | 701/37 |
| 5,623,410 | 4/1997 | Furihata et al. | 701/37 |
| 5,799,261 | 8/1998 | Ozaki et al. | 701/78 |

*Primary Examiner*—William A. Cuchlinski, Jr.
*Assistant Examiner*—Gertrude Arthur
*Attorney, Agent, or Firm*—Gregory P. Brown; Roger L. May

[57] ABSTRACT

A method is provided for improving response time in a vehicle active tilt control system having front and rear stabilizer bars adjustable by front and rear hydraulic actuators which are movable in first and second opposing directions for adjusting vehicle body roll resistance provided by the stabilizer bars, and having a pressure control valve for controlling hydraulic pressure to the actuators. The method includes the following steps: a) operating only a single lateral accelerometer to determine the direction and magnitude of lateral acceleration during vehicle maneuvers; b) establishing the direction of movement of the front and rear hydraulic actuators in response to the determined direction of lateral acceleration; c) adjusting the pressure control valve in response to the determined magnitude of lateral acceleration; d) determining the rate of change of the magnitude of lateral acceleration as the magnitude of lateral acceleration decreases past a predetermined first threshold; and e) switching direction of movement of the front and rear hydraulic actuators in response to the determined rate of change of the magnitude of lateral acceleration, thereby anticipating directional changes in lateral acceleration to improve response time in adjusting vehicle body roll resistance during vehicle maneuvers.

10 Claims, 3 Drawing Sheets

METHOD OF IMPROVING RESPONSE TIME IN A VEHICLE ACTIVE TILT CONTROL SYSTEM

TECHNICAL FIELD

The present invention relates to a method of improving response time in a vehicle active tilt control system employing only a single lateral accelerometer for determining the direction and magnitude of lateral acceleration, wherein directional changes in lateral acceleration are anticipated for improving response time.

BACKGROUND OF THE INVENTION

Automotive vehicles having independent suspensions are generally equipped with stabilizers to reduce inclination or roll of the vehicle bodies during vehicle maneuvers. The stabilizer bar is usually connected between the suspension arms of the vehicle wheels and frame or body members. When the left and right wheels are in similar positions with respect to the suspensions, the stabilizer bar does not twist so that the suspensions are mutually independent. When one wheel passes over a projection on the road surface, or when the vehicle turns and the left wheel and the right wheel assume considerably different positions with respect to the suspensions, the stabilizer bar is twisted. This twisting motion induces a torsional resilient force for affecting the rolling characteristic of the vehicle and the road-surface-following characteristic of the vehicle wheels.

It is desirable that the torsional resilient force of the stabilizer bars can be adjusted in accordance with running or traveling conditions of the vehicle. Specifically, it is desirable to reduce the torsional rigidity during straight travel of the vehicle and to increase the torsional rigidity during turning of the vehicle. The reduced torsional rigidity enhances the road-surface-following characteristic of the vehicle wheels while the increased torsional rigidity enhances the roll characteristic of the vehicle.

Certain vehicle active tilt control systems include front and rear stabilizer bars which are adjustable by front and rear hydraulic actuators placed in lieu of the stabilizer bar linkages. The actuators are movable in extension and compression directions for adjusting vehicle body roll resistance provided by the stabilizer bars. Because the hydraulic actuators require the alternating flow and pressurization of fluid, a time lag exists in the stabilizer bar torsional resistance adjustment when the vehicle experiences certain turning maneuvers in which the direction of lateral acceleration is quickly reversed.

Known systems for improving response time in such a vehicle active tilt control system require a plurality of sensors on the vehicle for improving system response time.

It is therefore desirable to provide a method of improving response time in a vehicle active tilt control system which includes only a single lateral accelerometer for measurement of lateral acceleration.

DISCLOSURE OF THE INVENTION

The present invention overcomes the above-referenced shortcomings of prior art vehicle active tilt control systems by providing a method of improving response time in a vehicle active tilt control system including only a single lateral accelerometer. The system anticipates directional changes in lateral acceleration for early switching of actuator movement direction and for maintenance of actuator pressures in order to improve response time.

More specifically, the present invention provides a method of improving response time in a vehicle active tilt control system having front and rear stabilizer bars adjustable by front and rear hydraulic actuators which are movable in first and second opposing directions for adjusting vehicle body roll resistance provided by the stabilizer bars, and having a pressure control valve for controlling hydraulic pressure to the actuators. The method comprises the steps of: a) operating only a single lateral accelerometer to determine the direction and magnitude of lateral acceleration during vehicle maneuvers; b) establishing the direction of movement of the front and rear hydraulic actuators in response to the determined direction of lateral acceleration; c) adjusting the pressure control valve in response to the determined magnitude of lateral acceleration; d) determining the rate of change of the magnitude of lateral acceleration as the magnitude of lateral acceleration decreases past a predetermined first threshold; and e) switching direction of movement of the front and rear hydraulic actuators in response to the determined rate of change of the magnitude of lateral acceleration, thereby anticipating directional changes in lateral acceleration to improve response time in adjusting vehicle body roll resistance during vehicle maneuvers.

In the preferred embodiment, the step of adjusting the pressure control valve comprises maintaining a substantially constant hydraulic pressure to the actuators when the switching step occurs. Preferably, the hydraulic pressure is decreased gradually in incremental steps until the magnitude of lateral acceleration returns to a level corresponding with the existing hydraulic pressure.

Accordingly, an object of the present invention is to improve response time in a vehicle active tilt control system having only a single lateral accelerometer when the vehicle experiences rapid changes in direction of lateral acceleration.

The above object and other objects, features, and advantages of the present invention are readily apparent from the following detailed description of the best mode for carrying out the invention when taken in connection with the accompanying drawings.

DETAILED DESCRIPTION OF THE PREFERRED EMBODIMENT

Figure 1:
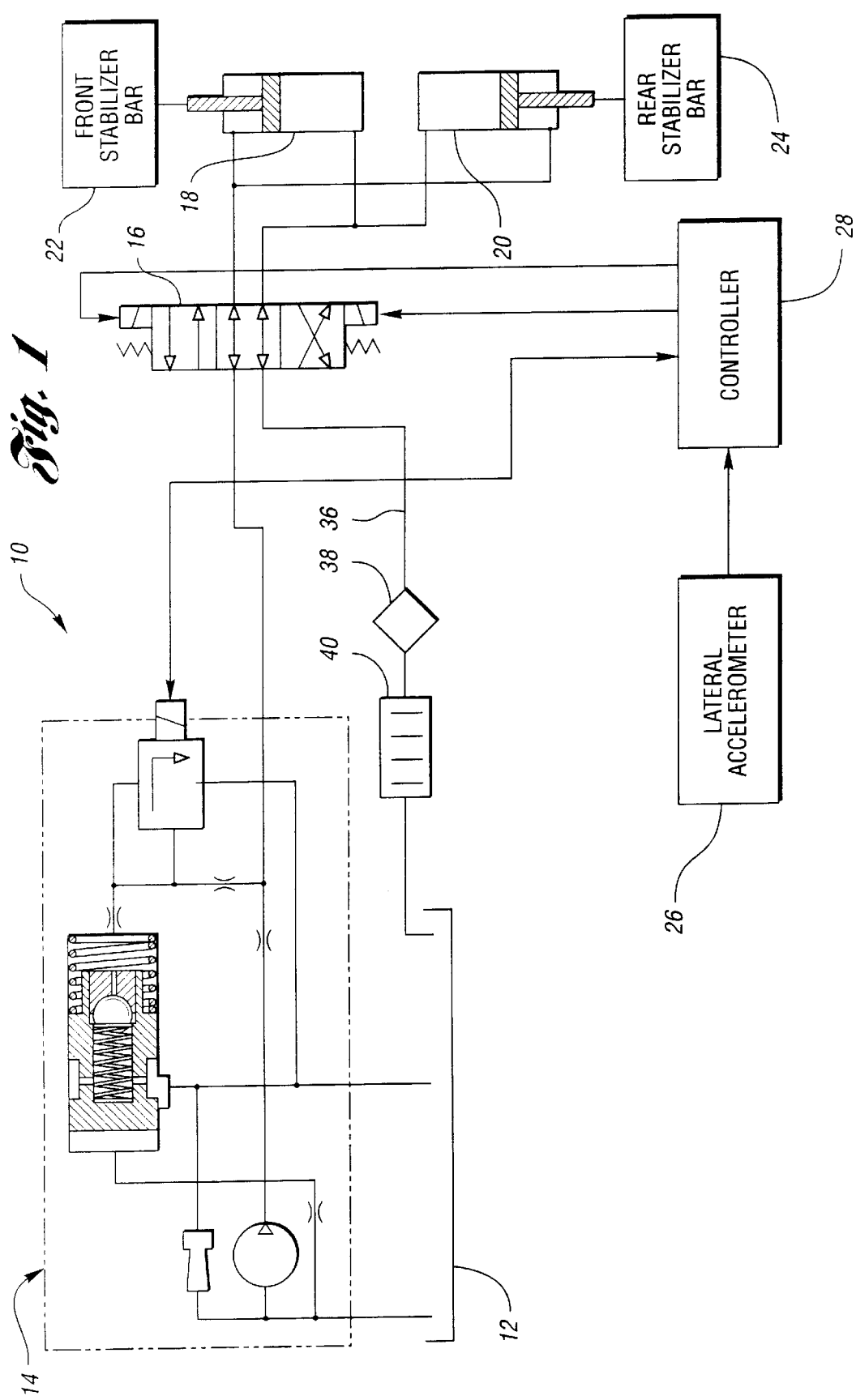
FIG. 1 shows a schematically arranged flow diagram of a vehicle active tilt control system with a testing control system in accordance with the present invention.

Referring to FIG. 1, a vehicle active tilt control system 10 is shown in accordance with the present invention. As shown, a hydraulic tank 12 provides hydraulic fluid which is pumped by the pump 14 which includes a variable pressure control valve therein. The pressure control valve within the pump is operative to control hydraulic pressure within the system. Pressurized fluid is accordingly provided from the pump 14 to the directional control valve 16.

The directional control valve 16 selectively directs the pressurized fluid to opposing chambers in the front and rear actuators 18,20 for establishing the direction of movement of the actuators 18,20. The front and rear actuators 18,20 are connected, respectively, to the front and rear stabilizer bars 22,24 in lieu of the stabilizer bars' linkages. Preferably, the front and rear actuators 18,20 are single rod end double-acting actuators. The actuators 18,20 wind-up the stabilizer bars 22,24, thus creating the desired force needed to resist body roll during vehicle maneuvers.

The vehicle active tilt control system 10 includes only a single lateral accelerometer 26 which measures the direction and magnitude of lateral acceleration during vehicle maneuvers. A controller 28 is provided for receiving signals from the lateral accelerometer 26 for controlling the directional control valve 16 and the pressure control valve in the pump 14.

FIG. 1 also shows a fluid return circuit 36, which includes a filter 38 and cooler 40 for returning the hydraulic fluid to the tank 12 from the actuators 18,20.

Based on lateral acceleration from the lateral accelerometer 26 and vehicle speed signals, the pressure control valve within the pump 14 and the directional valve 16 are controlled. Together, these valves determine the pressure (force) and direction (extend or compress) of the actuators 18,20 for winding-up the stabilizer bars 22,24.

Figure 2:
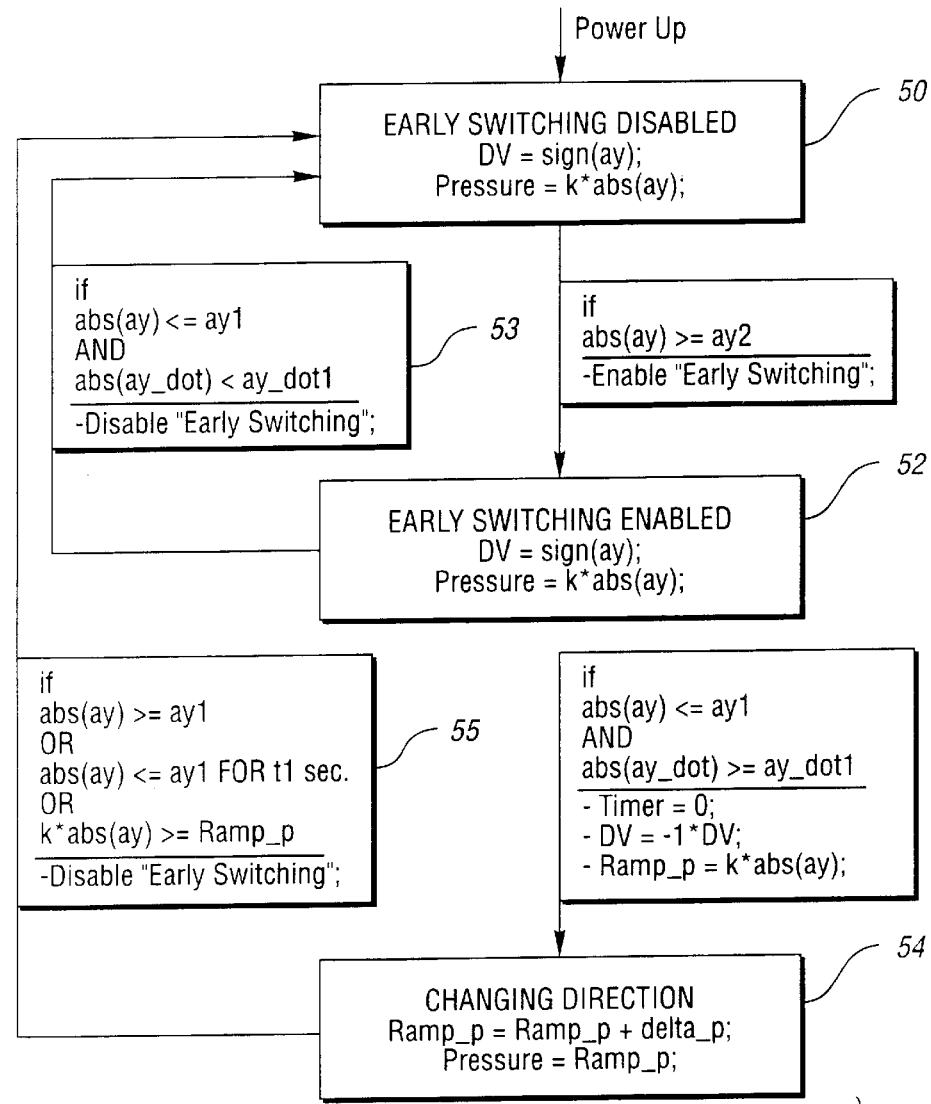
FIG. 2 shows a state transition diagram of an active tilt control system in accordance with the present invention.

The invention, as described with reference to FIG. 2, provides an algorithm for improving the response time of an active tilt control system when the vehicle equipped with this system is driven through rapid changes of steering direction.

When driven through a maneuver that requires changing from one steering direction to the other, a vehicle equipped with an active tilt control system may exhibit a lag in system response as it begins turning in the new direction, resulting in the vehicle's occupants feeling an objectionable transient lean in the direction opposite the new turning direction. This behavior is caused by the time required to build up hydraulic pressure corresponding to the new direction of turn in order to resist the rolling tendency of the vehicle's sprung mass. The active tilt control system's control module considers the magnitude and sign of the filtered lateral acceleration signal from the lateral accelerometer 26 to determine how much current to provide the pressure control valve within the pump 14 and to determine in which direction to energize the directional control valve 16 for sending pressurized fluid to the appropriate chambers within the actuators 18,20. The algorithm provides a method to determine whether to switch the directional valve 16 earlier than would otherwise be the case, in order to improve the system response. Additionally, the algorithm changes the way it determines the signal to the pressure control valve 16 in special cases that correspond to rapid changes of vehicle direction.

Figure 3A:
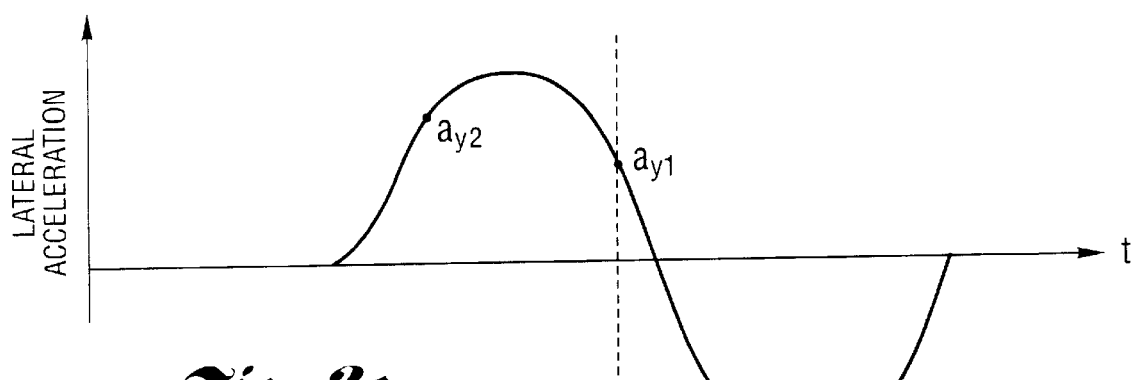
FIG. 3a shows a lateral acceleration vs. time graph in accordance with the present invention.

The first aspect of the algorithm is the early switching strategy. Ordinarily, the signal to the directional valve 16 is determined by the sign of the filtered lateral acceleration signal. However, when the vehicle's filtered lateral acceleration is decreasing from more than some threshold value, $a_{y2}$, as shown in FIG. 3a, which is a system performance tuning parameter, the early switching strategy can be invoked. As shown in FIG. 2, when the system is initially powered up, the early switching is disabled (step 50). At that time, the directional valve command is determined by the sign of the filtered lateral acceleration from the lateral accelerometer 26. Also, the pressure in the system, as determined by the pressure control valve within the pump 14 is equal to a constant (k) multiplied by the absolute value of the filtered lateral acceleration.

If the absolute value of the filtered lateral acceleration is greater than or equal to the second threshold value, $a_{y2}$, then early switching is enabled at step 52.

At the moment when the filtered lateral acceleration from the lateral accelerometer 26 is equal to a first threshold value $a_{y1}$, as shown in FIG. 3a, which is also a tuning parameter, the control module calculates the time derivative of the filtered lateral acceleration. If the derivative is greater than some threshold value, ay_dot1, the strategy assumes that the maneuver is going to result in the vehicle turning in the opposite direction, as indicated at step 54 in FIG. 2. In this case, the module immediately sends a command to change the position of the directional valve 16. Hydraulic pressure begins to build up in the correct direction for the anticipated direction of turn. Without this element of the strategy, the directional valve 16 would not be switched until the vehicle's filtered lateral acceleration passed through zero, as illustrated by the dashed lines in FIG. 3c. By switching the directional valve 16 earlier while the vehicle is still turning in the initial direction at filtered lateral acceleration $a_{y1}$, the system lag is reduced and performance is improved.

Figure 3B:
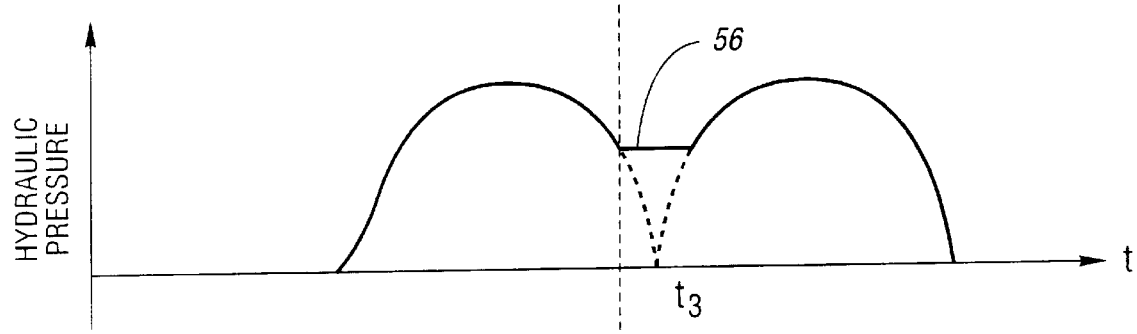
FIG. 3b shows a hydraulic pressure vs. time graph in accordance with the present invention.
Figure 3C:
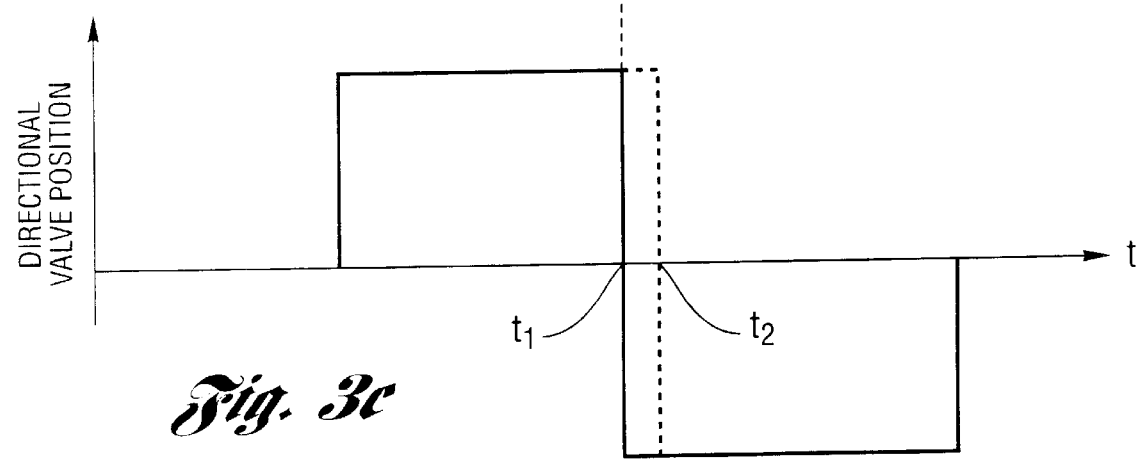
FIG. 3c shows an actuator movement direction vs. time graph in accordance with the present invention.

As shown in FIG. 3c, the direction switch occurs at time $t_1$, as opposed to time $t_2$ when the switch would normally occur during directional changes. When the vehicle's motion is established in the new direction, at time $t_2$, the control of the directional valve 16 reverts to being dictated by the sign of the filtered lateral acceleration signal.

The second aspect of the algorithm is the pressure control valve command modification. This aspect is also applicable when the vehicle's filtered lateral acceleration decreases from more than the threshold value $a_{y1}$. As the filtered lateral acceleration decreases through the threshold value $a_{y1}$, the module begins calculating the pressure control valve command in a new way. Ordinarily, the pressure control valve command is directly proportional to the filtered lateral acceleration. However, in the situation just described, the control module calculates the pressure control valve command that is directly proportional to the filtered lateral acceleration. It also calculates a pressure control valve command that decreases by a fixed amount, delta_p, in each time step, beginning when the filtered lateral acceleration is equal to $a_{y1}$. In other words, the hydraulic pressure is maintained substantially constant to the actuators when the directional switching step occurs. Preferably, the hydraulic pressure is gradually decreased in increments of delta_p.

The signal actually sent to the pressure control valve is the greater of the command that is directly proportional to the filtered lateral acceleration and the command that decreases by delta_p in each time step. This aspect of the algorithm prevents the pressure control valve command from dropping off too quickly, thereby improving the transient response of the active tilt control system. In this strategy, the amount by which the linearly decreasing calculation decreases in each time step, delta_p, can be varied to tune the performance of the system. A sample delta_p ramp slope is illustrated by the solid line 56 in FIG. 3b. When the vehicle's motion is established in the new direction, at time $t_3$ shown in FIG. 3b, the signal to the pressure control valve once again reverts to being proportional to the magnitude of the filtered lateral acceleration signal, i.e., the step of maintaining a substantially constant hydraulic pressure terminates when the magnitude of lateral acceleration returns to a level corresponding with the substantially constant hydraulic pressure.

Returning to step 52, if the derivative of the acceleration signal is less than the predetermined value (step 53 of FIG. 2), which is the slope of the curve at point $a_{y1}$ in FIG. 3a, then the system returns to step 50 and the early switching is disabled.

Similarly, returning to step 54, if the absolute value of the filtered lateral acceleration is greater than $a_{y1}$, or the absolute value of the filtered lateral acceleration is less than or equal to $a_{y1}$ for a predetermined period of time, or a constant (k) multiplied by the absolute value of the filtered lateral acceleration is greater than or equal to the existing hydraulic pressure (step 55 of FIG. 2), then the early switching is disabled, as illustrated in the state transition diagram of FIG. 2.

All threshold values used by this algorithm can be tuned to enhance vehicle and system performance. One strategy that implements both aspects of the algorithm described above is shown in FIG. 2.

While the best mode for carrying out the invention has been described in detail, those familiar with the art to which this invention relates will recognize various alternative designs and embodiments for practicing the invention within the scope of the appended claims.

What is claimed is:

1. A method of improving response time in a vehicle active tilt control system having front and rear stabilizer bars adjustable by front and rear hydraulic actuators which are movable in first and second opposing directions for adjusting vehicle body roll resistance provided by the stabilizer bars, and having a pressure control valve for controlling hydraulic pressure to the actuators, the method comprising:

operating only a single lateral accelerometer to determine the direction and magnitude of lateral acceleration during vehicle maneuvers;

establishing the direction of movement of the front and rear hydraulic actuators in response to the determined direction of lateral acceleration;

adjusting the pressure control valve in response to the determined magnitude of lateral acceleration;

determining the rate of change of the magnitude of lateral acceleration as the magnitude of lateral acceleration decreases past a predetermined first threshold; and switching direction of movement of the front and rear hydraulic actuators in response to the determined rate of change of the magnitude of lateral acceleration, thereby anticipating directional changes in lateral acceleration to improve response time in adjusting vehicle body roll resistance during vehicle maneuvers.

2. The method of claim 1, wherein said step of adjusting the pressure control valve comprises maintaining a substantially constant hydraulic pressure to the actuators when said switching step occurs.

3. The method of claim 2, wherein said step of maintaining a substantially constant hydraulic pressure terminates when the magnitude of lateral acceleration returns to a level corresponding with said substantially constant hydraulic pressure.

4. The method of claim 2, wherein said step of maintaining a substantially constant hydraulic pressure comprises maintaining a gradually decreasing hydraulic pressure.

5. The method of claim 1, further comprising enabling early switching of actuator movement direction when the magnitude of lateral acceleration exceeds a predetermined second threshold in order to enable said switching step.

6. A method of improving response time in a vehicle active tilt control system having front and rear stabilizer bars adjustable by front and rear hydraulic actuators which are movable in first and second opposing directions for adjusting vehicle body roll resistance provided by the stabilizer bars, and having a pressure control valve for controlling hydraulic pressure to the actuators, the method comprising:

operating only a single lateral accelerometer to determine the direction and magnitude of lateral acceleration during vehicle maneuvers;

establishing the direction of movement of the front and rear hydraulic actuators in response to the determined direction of lateral acceleration;

adjusting the pressure control valve in response to the determined magnitude of lateral acceleration;

determining the rate of change of the magnitude of lateral acceleration as the magnitude of lateral acceleration decreases past a predetermined first threshold;

switching direction of movement of the front and rear hydraulic actuators in response to the determined rate of change of the magnitude of lateral acceleration, thereby anticipating directional changes in lateral acceleration to improve response time in adjusting vehicle body roll resistance during vehicle maneuvers; and wherein said step of adjusting the pressure control valve comprises maintaining a substantially constant hydraulic pressure to the actuators when said switching step occurs.

7. The method of claim 6, wherein said step of maintaining a substantially constant hydraulic pressure terminates when the magnitude of lateral acceleration returns to a level corresponding with said substantially constant hydraulic pressure.

8. The method of claim 6, wherein said step of maintaining a substantially constant hydraulic pressure comprises maintaining a gradually decreasing hydraulic pressure.

9. The method of claim 6, further comprising enabling early switching of actuator movement direction when the magnitude of lateral acceleration exceeds a predetermined second threshold in order to enable said switching step.

10. A method of improving response time in a vehicle active tilt control system having front and rear stabilizer bars adjustable by front and rear hydraulic actuators which are movable in first and second opposing directions for adjusting vehicle body roll resistance provided by the stabilizer bars, and having a pressure control valve for controlling hydraulic pressure to the actuators, the method comprising:

operating only a single lateral accelerometer to determine the direction and magnitude of lateral acceleration during vehicle maneuvers;

establishing the direction of movement of the front and rear hydraulic actuators in response to the determined direction of lateral acceleration;

adjusting the pressure control valve in response to the determined magnitude of lateral acceleration;

determining the rate of change of the magnitude of lateral acceleration as the magnitude of lateral acceleration decreases past a predetermined first threshold;

switching direction of movement of the front and rear hydraulic actuators in response to the determined rate of change of the magnitude of lateral acceleration, thereby anticipating directional changes in lateral acceleration to improve response time in adjusting vehicle body roll resistance during vehicle maneuvers; and wherein said step of adjusting the pressure control valve comprises maintaining a gradually decreasing hydraulic pressure to the actuators when said switching step occurs.

* * * * *